US012640324B2

(12) United States Patent
Patwardhan et al.

(10) Patent No.: US 12,640,324 B2
(45) Date of Patent: May 26, 2026

(54) ANGULAR STEPPED U-CORE AND ARMATURE PLATE SYSTEM GENERATING INCREASED MAGNETIC FORCE FOR TRIP MECHANISM OF CIRCUIT BREAKER

(71) Applicant: EATON INTELLIGENT POWER LIMITED, Dublin (IE)

(72) Inventors: Sujit Subhash Patwardhan, Pune (IN); Shashank Bharat Kadam, Pune (IN); Sandip Nagtilak, Solapur (IN); Yash Pandya, Bharuch (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 259 days.

(21) Appl. No.: 18/618,099

(22) Filed: Mar. 27, 2024

(65) Prior Publication Data

US 2025/0308829 A1 Oct. 2, 2025

(51) Int. Cl.

*H01H 71/24* (2006.01)
*H01H 71/52* (2006.01)
*H01H 71/04* (2006.01)

(52) U.S. Cl.

CPC ........ *H01H 71/2472* (2013.01); *H01H 71/52* (2013.01); *H01H 71/04* (2013.01)

(58) Field of Classification Search

CPC .... H01H 71/2472; H01H 71/52; H01H 71/04; H01H 71/505
See application file for complete search history.

(56) References Cited

U.S. PATENT DOCUMENTS 4,080,582 A * 3/1978 Link ...................... H01H 71/40 335/37
4,220,935 A * 9/1980 Wafer ................ H01H 71/2454 335/38
6,750,743 B1 * 6/2004 Subramanian ....... H01H 71/405 335/8
2016/0005555 A1 * 1/2016 Najera ............... H01H 71/2454 335/43

* cited by examiner

*Primary Examiner* — Mohamad A Musleh
(74) *Attorney, Agent, or Firm* — Eckert Seamans Cherin & Mellott, LLC

(57) ABSTRACT

An improved magnetic trip mechanism for a circuit breaker includes a magnetizable U-shaped core and an armature whose shapes are advantageously designed to increase magnetic force within a compact footprint. In particular, the magnetizable U-core comprises step formations that enable the armature to be received at least partially within the U-core, thus enabling the armature to move a greater distance as compared to an arrangement including a non-stepped U-core while maintaining or decreasing the footprint of the circuit breaker. The arms of the U-core can additionally comprise slanted surfaces in order to further increase the surface area of the U-core and thus increase the number of magnetic field lines and magnetic force generated when the U-core is energized.

12 Claims, 8 Drawing Sheets

ANGULAR STEPPED U-CORE AND ARMATURE PLATE SYSTEM GENERATING INCREASED MAGNETIC FORCE FOR TRIP MECHANISM OF CIRCUIT BREAKER

FIELD OF THE INVENTION

The disclosed concept relates generally to circuit breakers, and in particular, to systems that generate force to actuate a movable conductor away from a stationary conductor under a trip condition.

BACKGROUND OF THE INVENTION

Circuit interrupters, such as for example and without limitation, circuit breakers, are typically used to protect electrical components and systems from damage caused by overcurrent conditions, such as and not limited to: overload conditions, short circuits, arc faults, and ground faults. Circuit breakers typically include mechanically separable contacts, an operating mechanism configured to operate the separable contacts as a switch, a trip mechanism configured to automatically actuate the operating mechanism during a fault condition, and an operating handle operably connected to the operating mechanism. The separable contacts are configured to be actuated between a closed state and an open state by the operating mechanism. In the closed state, the separable contacts are in physical and electrical contact with one another, enabling current to flow from the line side to the load side of the circuit breaker. In the open state, the separable contacts are physically separated and electrically isolated from one another, so as to prevent the flow of current between the line side and the load side of the circuit breaker.

In many circuit breakers, each pole assembly has a stationary conductor comprising a stationary separable contact and a movable conductor comprising a movable separable contact. The stationary conductor remains fixed in position at all times, while the movable conductor is structured to move between a closed state and an open state, with the movable separable contact being in physical contact with the stationary separable contact in the closed state and the movable separable contact being physically separated from the stationary separable contact in the open state. Opening the movable conductor from the closed state as quickly as possible during a fault condition is imperative, in order to stop the flow of current as quickly as possible and prevent/minimize damage done to the circuit breaker, the load, and any other associated circuitry. As such, no matter how quickly existing circuit breakers are able to achieve opening of separable contacts, faster opening is always desirable. Achieving faster opening of the separable contacts requires increasing the force with which the movable conductor is opened.

There is thus room for improvement in systems used to actuate movable conductors in circuit breakers.

SUMMARY OF THE INVENTION

These needs, and others, are met by an improved trip mechanism for a circuit breaker. The trip mechanism is a magnetic trip mechanism comprising a magnetizable U-shaped core (a U-core) and an armature whose shapes are advantageously designed to increase magnetic force within a compact footprint. In particular, the magnetizable U-core comprises step formations that enable the armature to be received at least partially within the U-core, thus enabling the armature to move a greater distance as compared to an arrangement including a non-stepped U-core while maintaining or decreasing the footprint of the circuit breaker. The arms of the U-core can additionally comprise slanted surfaces in order to further increase the surface area of the U-core and thus increase the number of magnetic field lines and magnetic force generated when the U-core is energized.

In one aspect of the disclosed concept, a trip mechanism for use with a circuit breaker is provided. The circuit breaker includes a movable conductor and an operating mechanism structured to actuate the movable conductor, the movable conductor being structured to be actuated between a closed state and an open state relative to a stationary conductor in order to respectively close and open an electrical connection between a line conductor and a load conductor, and the operating mechanism is configured to actuate the movable conductor to its open state when the operating mechanism is disengaged from the trip mechanism. The trip mechanism comprises: a magnetizable U-core, the U-core being a U-shaped core; an armature structured to be actuated by the U-core; and a lever arm coupled at one end to the armature. The U-core is structured to be coupled to the load conductor and to be energized by current through the load conductor. The lever arm is structured to maintain engagement with the operating mechanism when current through the load conductor is within a current rating of the circuit breaker. The U-core comprises a base and two arms extending from the base, with the base extending between the two arms in a width dimension and the two arms extending from the base in a height dimension orthogonal to the width dimension. Each arm of the U-core comprises a thick portion having a major width and a thin portion having a minor width, with the major width spanning a greater distance in the width dimension than the minor width, and the thick portion extending from the base to the thin portion, with the thin portion extending from the thick portion away from the base. For each arm of the U-core, a step is formed at an interface of the thick portion and the thin portion. The U-core is structured such that, when current through the load conductor is within the current rating of the circuit breaker, the armature remains spaced apart from the step of each arm of the U-core and positioned between the thin portions of the U-core relative to the width dimension. The U-core is structured to be energized to pull the armature between the thin portions of the U-core toward the steps of the U-core when current flowing through the circuit breaker reaches a fault level threshold, such that the lever arm gets rotated to an actuated position. The lever arm is configured to disengage from the operating mechanism when the lever arm gets rotated to the actuated position.

In another aspect of the disclosed concept, a circuit breaker comprises a plurality of pole assemblies and an operating mechanism. Each pole assembly comprises: a line conductor and load conductor structured to provide an electrical connection between a corresponding load and a power source; a stationary conductor; a movable conductor; and a trip mechanism. The movable conductor is structured to be actuated between a closed state and an open state relative to the stationary conductor in order to respectively close and open the electrical connection between the line conductor and the load conductor. The trip mechanism is structured to be actuated when current through the load conductor exceeds a predetermined threshold. The trip mechanism comprises: a magnetizable U-core coupled to the load conductor, the U-core being a U-shaped core; an armature structured to be actuated by the U-core; and a lever arm coupled at one end to the armature. The operating mechanism is aligned with one of the pole assemblies and is operably coupled to the movable conductor of every pole assembly. With respect to the one pole assembly with which the operating mechanism is aligned, the lever arm of the one pole assembly is positioned to engage the operating mechanism when current through all of the pole assemblies is within the current rating of the circuit breaker. Each trip mechanism is operably coupled to every other trip mechanism in the circuit breaker. For each trip mechanism: the U-core comprises a base and two arms extending from the base, the base extending between the two arms in a width dimension and the two arms extending from the base in a height dimension orthogonal to the width dimension; each arm of the U-core comprises a thick portion having a major width and a thin portion having a minor width, with the major width spanning a greater distance in the width dimension than the minor width, and the thick portion extending from the base to the thin portion, with the thin portion extending from the thick portion away from the base; for each arm of the U-core, a step is formed at an interface of the thick portion and the thin portion; the trip mechanism is structured such that, when current through all pole assemblies is within the current rating of the circuit breaker, the armature is spaced apart from the steps of the U-core and positioned between the thin portions of the U-core relative to the width dimension; and the trip mechanism is structured such that, when current through the corresponding pole assembly reaches a fault level threshold, the U-core gets energized and pulls the armature between the thin portions of the U-core toward the steps of the U-core, such that the lever arm of the corresponding pole assembly and the lever arm of every other pole assembly gets rotated to an actuated position. With respect to the one pole assembly with which the operating mechanism is aligned, the lever arm of the one pole assembly is configured to disengage from the operating mechanism when the lever arm of the one pole assembly gets rotated to the actuated position. The operating mechanism is configured to actuate the movable conductor to its open state when the operating mechanism is disengaged from the lever arm of the one pole assembly.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
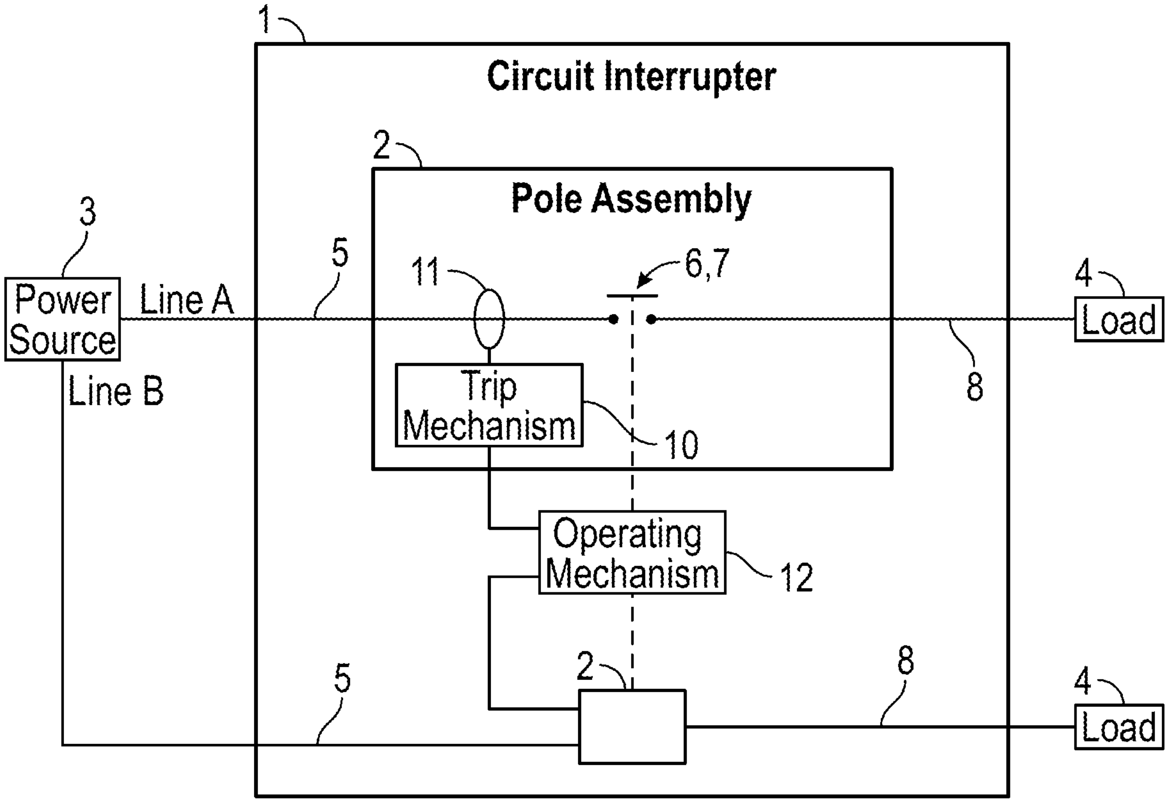
FIG. 1 is a schematic diagram of a two-pole circuit breaker in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

Figure 2:
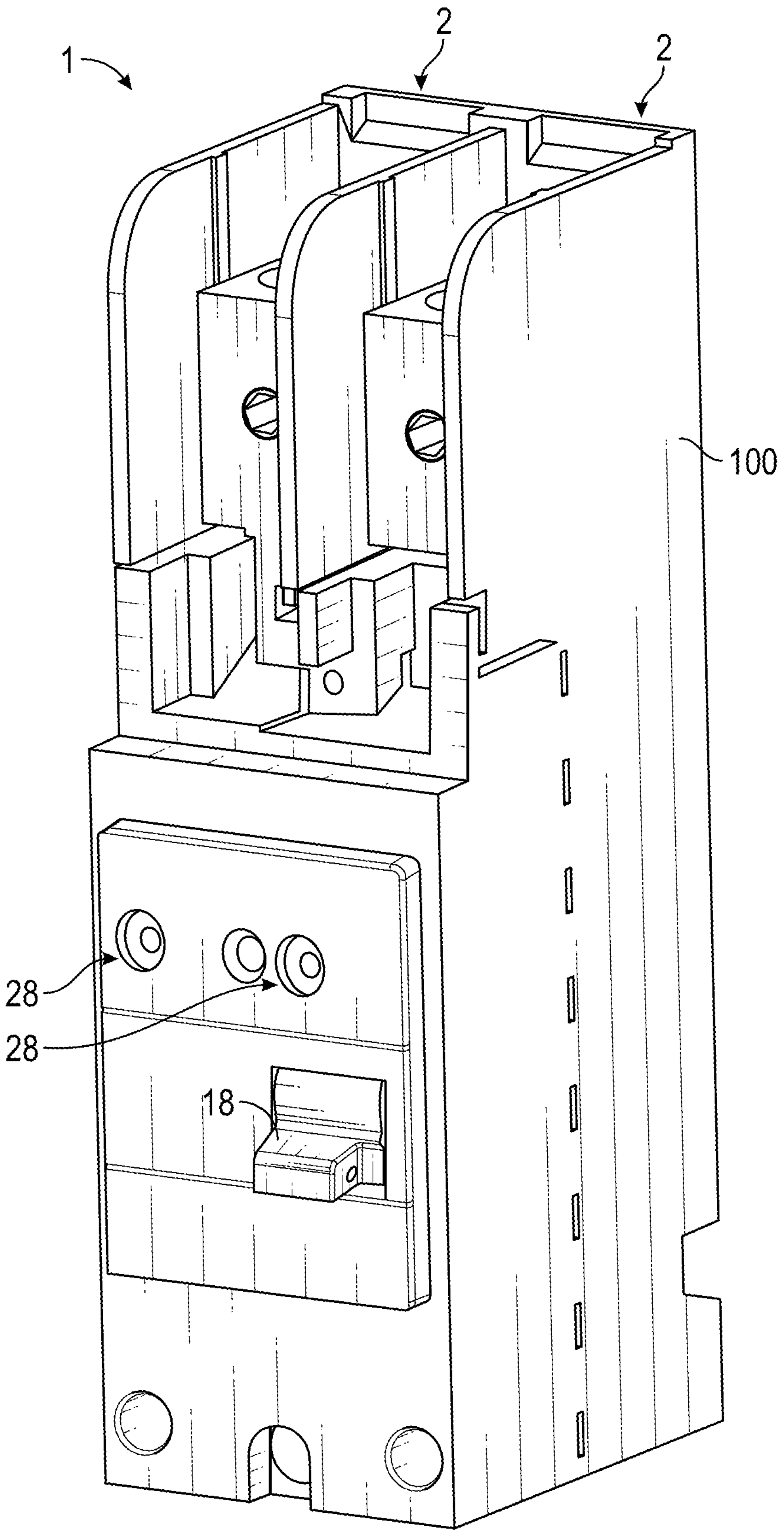
FIG. 2 is a partial isometric view of the exterior of the two-pole circuit breaker that is schematically depicted in FIG. 1.

FIG. 1 is a schematic diagram of a circuit breaker 1 with an improved trip mechanism, in accordance with an exemplary embodiment of the disclosed concept, and FIG. 2 shows the exterior of the two-pole circuit breaker 1 schematically depicted in FIG. 1. In particular, FIG. 2 shows the housing 100 that houses all of the internal components of the circuit breaker 1. As shown in FIG. 2, in an exemplary embodiment of the disclosed concept, the circuit breaker 1 is a plug-on type miniature circuit breaker. This is noted because the advantages of the disclosed improved trip mechanism of the circuit breaker 1 are most fully realized in the design of a plug-on type miniature circuit breaker. For illustrative purposes, it is noted that the particular circuit breaker 1 in which the electromagnetic attributes of the disclosed improved trip mechanism were observed is rated for 125 amps to 225 amps (125 A to 225 A), but it will be apparent that the concepts disclosed herein can be used with miniature circuit breakers of different ratings without departing from the scope of the disclosed concept.

As depicted in FIG. 1, the circuit breaker 1 includes a plurality of pole assemblies 2, with each pole assembly 2 being connected to a single phase of power. Specifically, two pole assemblies 2 are shown, but it will be apparent from the present disclosure that the concepts disclosed in relation to the pictured two-pole circuit breaker can be extended to a circuit breaker having more than two pole assemblies or having a single pole assembly if desired. For ease of illustration, only the pole assembly 2 connected to line A is shown in detail in FIG. 1, however, it should be noted that the pole assembly 2 connected to line B includes components identical to the components of the pole assembly 2 connected to line A and functions in the same manner as the pole assembly 2 connected to line A.

Each pole assembly 2 is structured to be electrically connected between a power source 3 and a load 4 via a line conductor 5, a pair of separable contacts 6,7, and a load conductor 8. Each pair of mechanical separable contacts 6,7 is structured to be actuated between a closed state (wherein the contacts 6,7 are in physical contact with and electrically connected to one another) and an open state (wherein the contacts 6,7 are physically separated and electrically isolated from one another). The separable nature of the separable contacts 6,7 is made apparent in FIG. 3 and detailed further in connection with FIG. 3. Within each pole assembly 2, when the separable contacts 6,7 are closed, power can flow from the power source 3 though the line conductor 5, through the separable contacts 6,7, and through the load conductor 8 to the load 4. Conversely, when the separable contacts 6,7 are open, the load conductor 8 becomes electrically isolated from the line conductor 5 and power cannot flow from the power source 3 to the load 4.

Each pole assembly 2 further comprises a trip mechanism 10 that includes a current sensor 11, and the circuit breaker 1 further includes an operating mechanism 12. Each trip mechanism 10 is operatively coupled to the operating mechanism 12 and structured to actuate the operating mechanism 12, and the operating mechanism 12 is structured to simultaneously open the separable contacts of both pole assemblies 2 when actuated by the trip mechanism 10 of either pole assembly 2. Specifically, the operating mechanism 12 is structured to trip open or switch open the separable contacts 6,7 of both pole assemblies 2 from the closed state during a fault condition (e.g., without limitation, an overcurrent condition) in order to interrupt current flowing between the power source 3 and all loads 4 connected to the circuit breaker 1. As detailed further later herein, the trip mechanism 10 is structured to be actuated when current through the circuit breaker 1 exceeds a predetermined fault level threshold.

The circuit breaker 1 is configured to enable the separable contacts 6,7 to be closed under normal operating conditions (i.e. when current through all pole assemblies 2 is within the current rating of the circuit breaker 1), so that current can flow from the power source 3 to all connected loads 4. In response to the current though either pole assembly 2 reaching a fault level threshold (as detected by the current sensor 11), the trip mechanism 10 of the faulted pole assembly 2 actuates the operating mechanism 12 to simultaneously open the mechanical separable contacts 6,7 of both pole assemblies 2 in order to interrupt current flowing through the entire circuit breaker 1. The opening of the mechanical separable contacts 6,7 can be referred to as an "opening operation".

Figure 3:
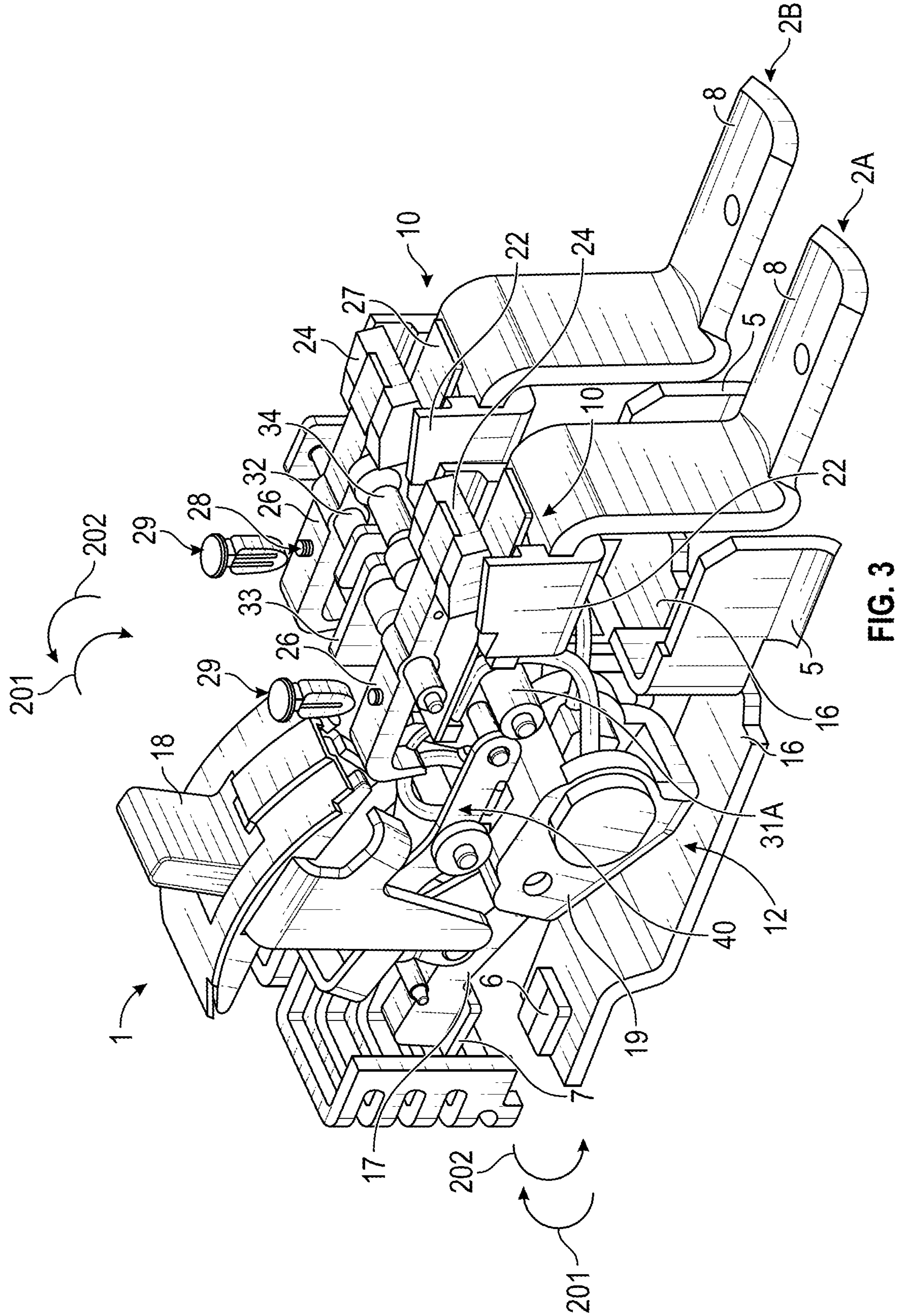
FIG. 3 is a perspective view of the two-pole circuit breaker shown in FIG. 2 with the housing removed so as to show the internal components of the circuit breaker, including improved trip assemblies, and showing the circuit breaker in a TRIP state with its separable contacts open, in accordance with an example embodiment of the disclosed concept.

Reference is now made to FIG. 3, which depicts the circuit breaker 1 with the housing 100 removed, in order to show the internal components of the circuit breaker 1. In viewing FIG. 3, it can be seen that the operating mechanism 12 is aligned with only one of the pole assemblies 2 (numbered as 2A in FIG. 3). The pole assemblies 2 are numbered as 2A and 2B in FIG. 3 for the purpose of being able to differentiate between the pole assembly 2A that is aligned with the operating mechanism 12 and the pole assembly 2B that is not aligned with the operating mechanism 12, but the pole assemblies 2A and 2B are otherwise functionally equivalent and can be referred to either collectively and generally or individually and generally with the reference number 2.

As shown in FIG. 3, each pole assembly 2 further includes a stationary conductor 16 that comprises the separable contact 6 and a movable conductor 17 that comprises the separable contact 7 (in the view shown in FIG. 3, the stationary conductor 16 and the movable conductor 17 of one pole assembly 2 are visible, and a portion of the stationary conductor 16 of the second pole assembly 2 is visible). Each separable contact 6 is thus also referred to hereafter as the "stationary separable contact 6", and each separable contact 7 is thus also referred to hereafter as the "movable separable contact 7". The movable conductor 17 is structured to be moved by the operating mechanism 12 between a closed state in which the separable contacts 6,7 are physically touching and an open state in which the separable contacts 6,7 are physically separated (the movable conductor 17 being shown in its open state in FIG. 3). Hereinafter, movement of the movable conductor 17 from its closed state to its open state is sometimes referred to as "opening" of the movable conductor 17.

The operating mechanism 12 is structured to be actuated between an OFF state, an ON state, and a TRIP state (the TRIP state being shown in FIG. 3), and the circuit breaker 1 further includes an operating handle 18 that indicates to the user of the circuit breaker 1 what the state of the operating mechanism 12 is (e.g. ON, OFF, TRIP). The operating handle 18 is operatively coupled to the operating mechanism 12 and extends from the interior of the housing 100 to the external environment (as can be discerned from viewing FIG. 3 in conjunction with FIG. 2). The operating mechanism 12 includes a drive shaft 19 that is structured to rotate and is operatively coupled to the moving conductors 17 of both pole assemblies 2, such that, when the drive shaft 19 is rotated, the moving conductors 17 of both pole assemblies 2 rotate simultaneously.

In the OFF state of the operating mechanism 12, the movable conductor 17 is in its open state, and the operating handle 18 is in an OFF position. In the ON state of the operating mechanism 12, the movable conductor 17 is in its closed state, and the operating handle 18 is in an ON position (the operating handle is in the ON position in FIG. 2, for example). The operating mechanism 12 is structured to enable a user to manually actuate the operating handle 18 in order to manually actuate the operating mechanism 12 between the ON and OFF states. In the TRIP state, the movable conductor 17 is in its open state, and the operating handle 18 is in a TRIP position. The operating mechanism 12 can only be automatically actuated to the TRIP state. More specifically, the operating mechanism 12 can only be automatically actuated to the TRIP state from the ON state, by the trip mechanism 10 of either pole assembly 2, under a fault condition. As previously noted, the operating mechanism 12 is depicted in the TRIP state in FIG. 3, and the operating handle 18 is accordingly depicted in the TRIP position.

Relative to the viewpoint of FIG. 3 and the TRIP position of the operating handle 18 shown in FIG. 3, the operating handle 18 would rotate clockwise 201 to move from the TRIP position to the OFF position, and the operating handle 18 would rotate counterclockwise 202 to move from the OFF position to the ON position (the ON position being disposed further counterclockwise 202 than the TRIP position). It is noted that the circuit breaker 1, like many other circuit breakers, is structured such that actuating the operating handle 18 to the ON position from the TRIP position will not actuate the operating mechanism 18 to its ON state, as the operating handle 18 must be manually actuated to the OFF position from the TRIP position in order to reset the operating mechanism 12 so that the operating mechanism 12 will be capable of being actuated to its ON state again. The disposition of the operating mechanism 12 in each of its states is discussed in more detail in conjunction with the detailed discussion of the trip mechanism 10 provided hereafter.

Figure 4:
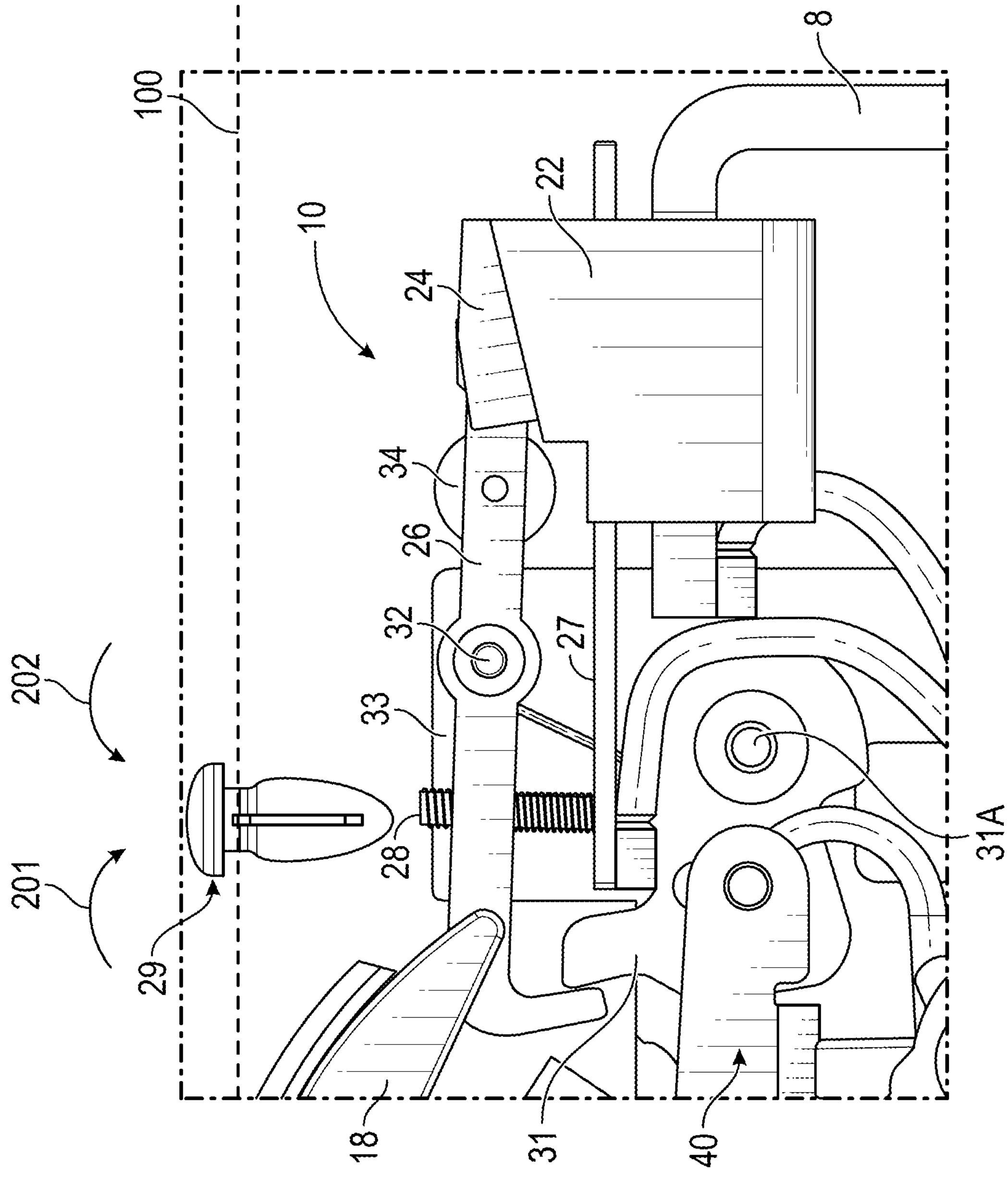
FIG. 4 is an elevation view of a portion of the interior of the two-pole circuit breaker shown in FIG. 3, providing a detailed view of the trip mechanism of one pole assembly and a latching component of the operating mechanism, in accordance with an example embodiment of the disclosed concept.

In FIG. 3, the trip mechanisms 10 of both pole assemblies 2 are shown. Each trip mechanism 10 comprises a magnetizable U-shaped core 22 (referred to hereinafter as the "U-core 22", the U-core 22 being an electromagnet), an armature plate 24 structured to be magnetized by the U-core 22, and a lever arm 26 fixedly coupled to the armature plate 24. Referring briefly to FIG. 4, a calibration bracket 27 is coupled to the U-core 22, and a calibration screw 28 couples the lever arm 26 to the calibration bracket 27. The dashed line in FIG. 4 is provided to represent the housing 100. The housing 100 comprises apertures that align with the calibration screws 28 in order to provide easy access to the calibration screws 28. When the circuit breaker is not being calibrated, screw covers 29 can be inserted into the apertures of the housing 100 in order to prevent dust and other contaminants from entering into the interior of the housing 100 (in FIG. 2, the screw covers 29 have been removed from the housing so that the calibration screws 28 can be accessed). The calibration screws 28 can be tightened or loosened as necessary to cause faster or slower tripping of the operating mechanism 12 under a fault condition. It is noted that driving the calibration screws 28 further down (relative to the view shown in FIG. 4) causes faster tripping.

Continuing to refer to FIGS. 3-4, as detailed further later herein, the design of the U-core 22 is particularly advantageous. It is noted that the U-core 22 is a specific implementation of the current sensor 11 depicted in FIG. 1. In particular, the U-core 22 of each pole assembly 2 is produced from a magnetically permeable material and is physically coupled to the load conductor 8 of the pole assembly 2, such that the U-core 22 will be energized to generate a magnetic field of a predetermined desired strength when current through the load conductor 8 reaches a predetermined fault level threshold, and such that the magnetic field generated by the U-core 22 will pull the armature plate 24 toward the U-core 22, thereby causing rotation of the corresponding lever arm 26 that trips the operating mechanism 12 (said rotation of the lever arm 26 being in the clockwise 201 direction, relative to the view shown in FIG. 3), as will be detailed further hereinafter. For example and without limitation, if it is desired to trip the operating mechanism 12 in overload conditions once the current in one of the load conductors 8 has reached a level ten times that of the rating of the circuit breaker (e.g. once the current reaches 2,000 A for a 200 A rating), then the specific dimensions and material of the U-core 22 can be chosen so that the U-core 22 will only generate a magnetic field strong enough to actuate the armature plate 24 to rotate the lever arm 26 to actuate the trip when the current through the load conductor 8 is at least ten times the magnitude of the current rating of the circuit breaker 1.

As shown in FIG. 3, each lever arm 26 is coupled by a rotating pin 32 to a stationary portion of the circuit breaker 1, such as a bracket 33 that is fixed in position relative to the circuit breaker housing 100. More specifically, each rotating pin 32 rotatably couples its corresponding lever arm 26 to the bracket 33 such that the lever arm 26 can rotate about the rotating pin 32 (i.e. in the clockwise 201 and counterclockwise 202 directions) while the axis of rotation of the lever arm 26 through the rotating pin 32 remains fixed in position. In addition, each lever arm 26 is fixedly coupled to the lever arm 26 of the other pole assembly 2 by a dowel 34, so that when one lever arm 26 is actuated to rotate by its corresponding U-core 22 and armature plate 24, the other lever arm 26 will rotate simultaneously.

Referring again to FIG. 4 in conjunction with FIG. 3, it is noted that the operating mechanism 12 comprises a trip latch 31, which may be easier to discern from the view provided in FIG. 4. Because the trip latch 31 is positioned differently in FIG. 3 than it is in FIG. 4, the only portion of the trip latch 31 that is visible in FIG. 3 is a pin 31A (numbered in both FIG. 3 and FIG. 4) that provides an axis of rotation for the trip latch 31. In viewing FIG. 3, it should be noted that the trip latch 31 is positioned to be engaged only by the lever arm 26 of the pole assembly that is aligned with the operating mechanism 12 (i.e. the pole assembly 2A) and cannot be engaged by the lever arm 26 of the other pole assembly (i.e. the pole assembly 2B). In FIG. 4 (which shows the trip mechanism 10 of the pole assembly 2A), the operating mechanism 12 is in the OFF state (as indicated by the position of the operating handle 18), and the lever arm 26 of the trip mechanism 10 engages the trip latch 31 of the operating mechanism 12. It is noted that the lever arm 26 engages the trip latch 31 in the ON state as well, and that the operating mechanism 12 can only be actuated to its ON state to close the movable conductors 17 when the lever arm 26 of the pole assembly 2A is engaging the trip latch 31. In contrast, as shown in FIG. 3, when the operating mechanism 12 in the TRIP state, the lever arm 26 of the pole assembly 2A does not engage the trip latch 31. More specifically, the operating mechanism 12 can only be actuated to the TRIP state from the ON state after the lever arm 26 of the pole assembly 2A has disengaged from the trip latch 31, as detailed further below.

The components of the trip mechanisms 10 are depicted in FIGS. 3-4 in an unactuated state, i.e. a state in which the U-core 22 and the armature plate 24 of the faulted pole are not magnetized. When the operating mechanism 12 is in the ON state such that the lever arm 26 of the pole assembly 2A is engaging the trip latch 31 (engagement of the trip latch 31 by the lever arm 26 being shown in FIG. 4), and the current through the load conductor 8 of either pole assembly 2 reaches a fault level, the U-core 22 of the faulted pole will generate a magnetic field strong enough to actuate the corresponding armature plate 24 to rotate the lever arm 26. Because of the mechanical linkage between the lever arms 26 of pole assemblies 2 provided by the dowel 34, the lever arm 26 that is positioned to engage the trip latch 31 will be actuated to disengage the trip latch 31 regardless of which pole assembly 2 the fault occurs in, since both lever arms 26 will rotate simultaneously regardless of which U-core 22 and armature plate 24 are magnetized during the fault.

Relative to the views shown in FIG. 3-4, rotation of the lever arm 26 under a fault condition is in the clockwise direction 201, due to the magnetic attraction between the armature plate 24 and the U-core 22. The lever arm 26 rotates far enough clockwise 201 that the lever arm 26 disengages from the trip latch 31 of the operating mechanism 12. Once the trip latch 31 is disengaged from the lever arm 26, the trip latch 31 falls away from the lever arm 26. The operating mechanism 12 comprises a plurality of linkages 40 (FIG. 3) that couple the trip latch 31 to the drive shaft 19 and to the operating handle 18, such that the trip latch 31 falling away from the lever arm 26 causes the drive shaft 19 to rotate the movable conductors 17 of both pole assemblies 2 clockwise 201 from their closed states to their open states, and also causes the operating handle 18 to rotate from the ON position to the TRIP position.

It will be appreciated that, once the movable conductors 17 have opened and the current in both pole assemblies 2 has been interrupted, the magnetic fields of the magnetized U-core 22 and armature plate 24 dissipate and the lever arms 26 rotate back to the unactuated position shown in FIG. 3 (i.e. the rotation of the lever arms 26 being counterclockwise 202, relative to the view shown in FIG. 3). However, because the trip latch 31 previously fell away from the lever arm 26 of the pole assembly 2A during the initial clockwise 201 rotation of the lever arms 26 due to the magnetization of the U-core 22 in the faulted pole assembly 2, the lever arm 26 of the pole assembly 2A cannot re-engage the trip latch 31, thus preventing the operating handle 18 from being able to be used to manually actuate the operating mechanism 12 to the ON state again without first manually resetting the operating mechanism 12. The details of the manual resetting of the operating mechanism 12 after a trip are not discussed herein, but it is noted that such manual resetting needs to be performed in order to operatively couple the operating handle 18 to the operating mechanism 12 again by re-engaging the lever arm 26 of the pole assembly 2A with the trip latch 31.

Figure 5A:
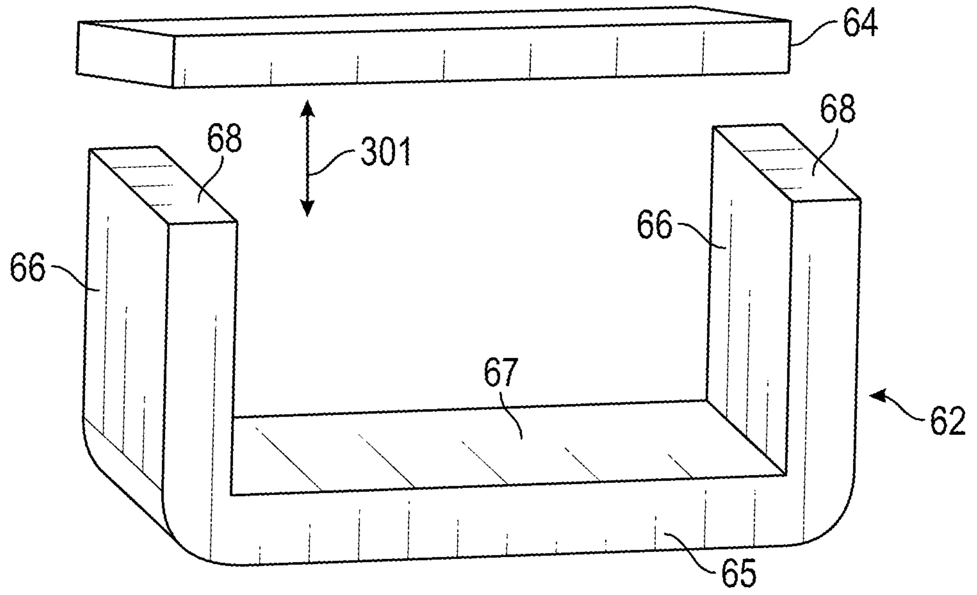
FIG. 5A (Prior Art)
FIG. 5A is a perspective view of a prior art U-core and armature plate used from a prior art magnetic trip mechanism.
Figure 5B:
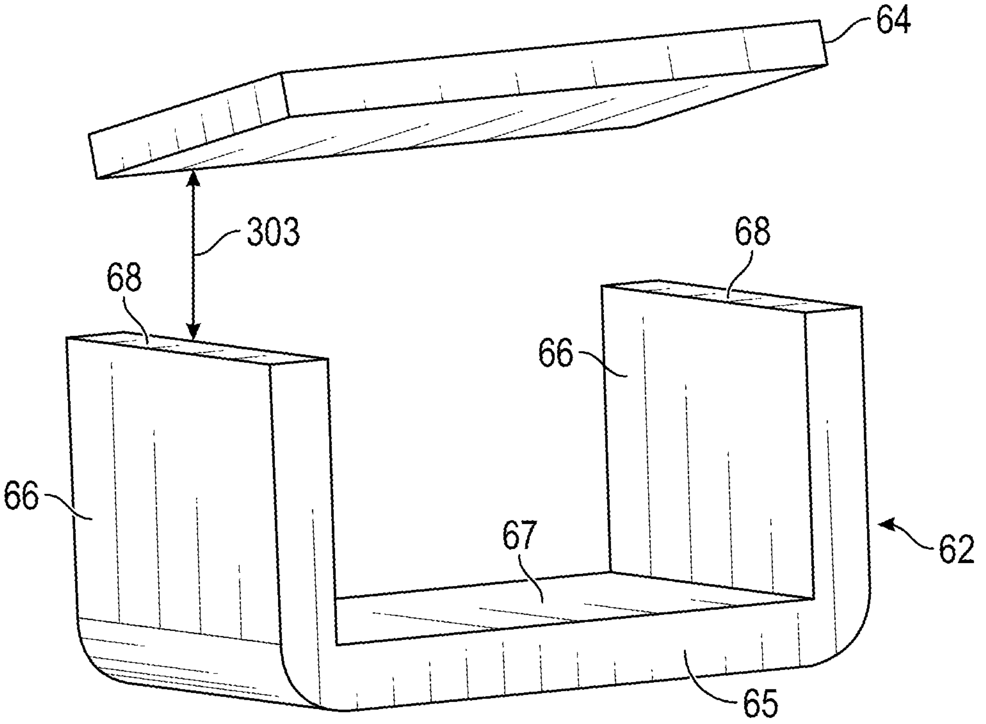
FIG. 5B (Prior Art)
FIG. 5B is a perspective view of the prior art U-core and armature plate shown in FIG. 5A with adjustments to the position of the armature plate that result in a pulling force between the U-core and armature plate being reduced.
Figure 6A:
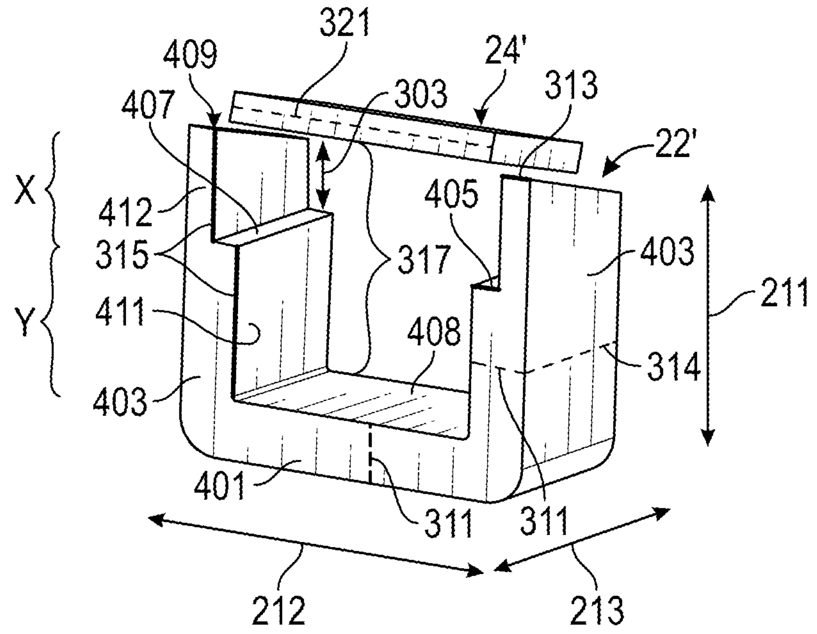
FIG. 6A is a perspective view of an improved U-core and armature plate arrangement, in accordance with an example embodiment of the disclosed concept.
Figure 6B:
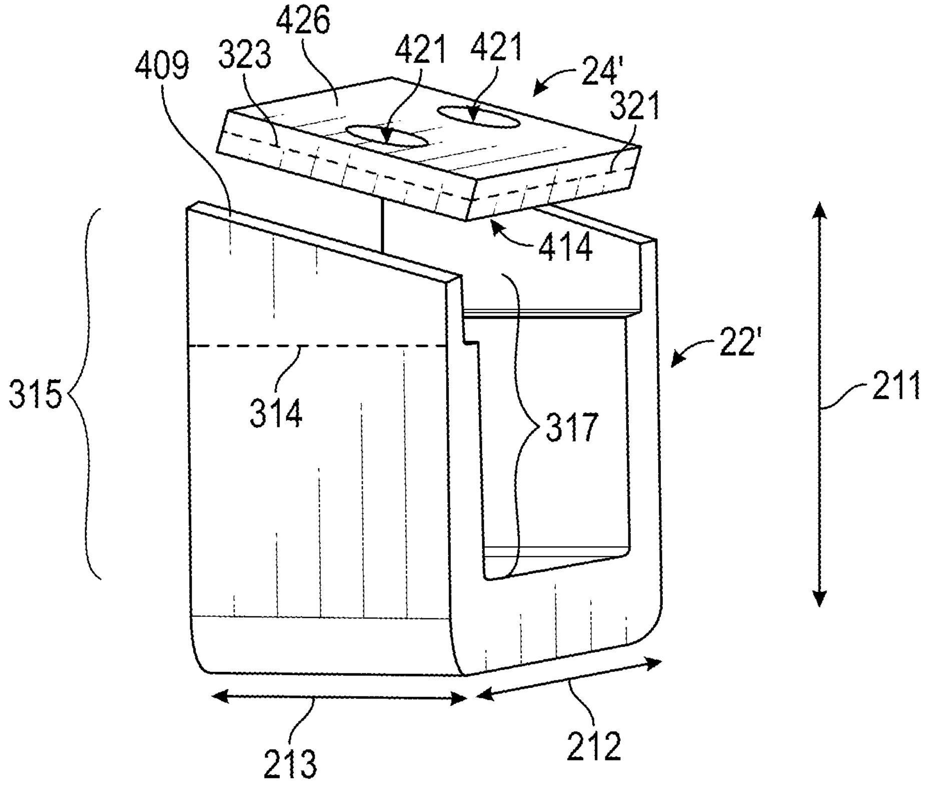
FIG. 6B is another perspective view of the improved U-core and armature plate arrangement shown in FIG. 6A and rotated relative to the view provided in FIG. 6A.
Figure 7:
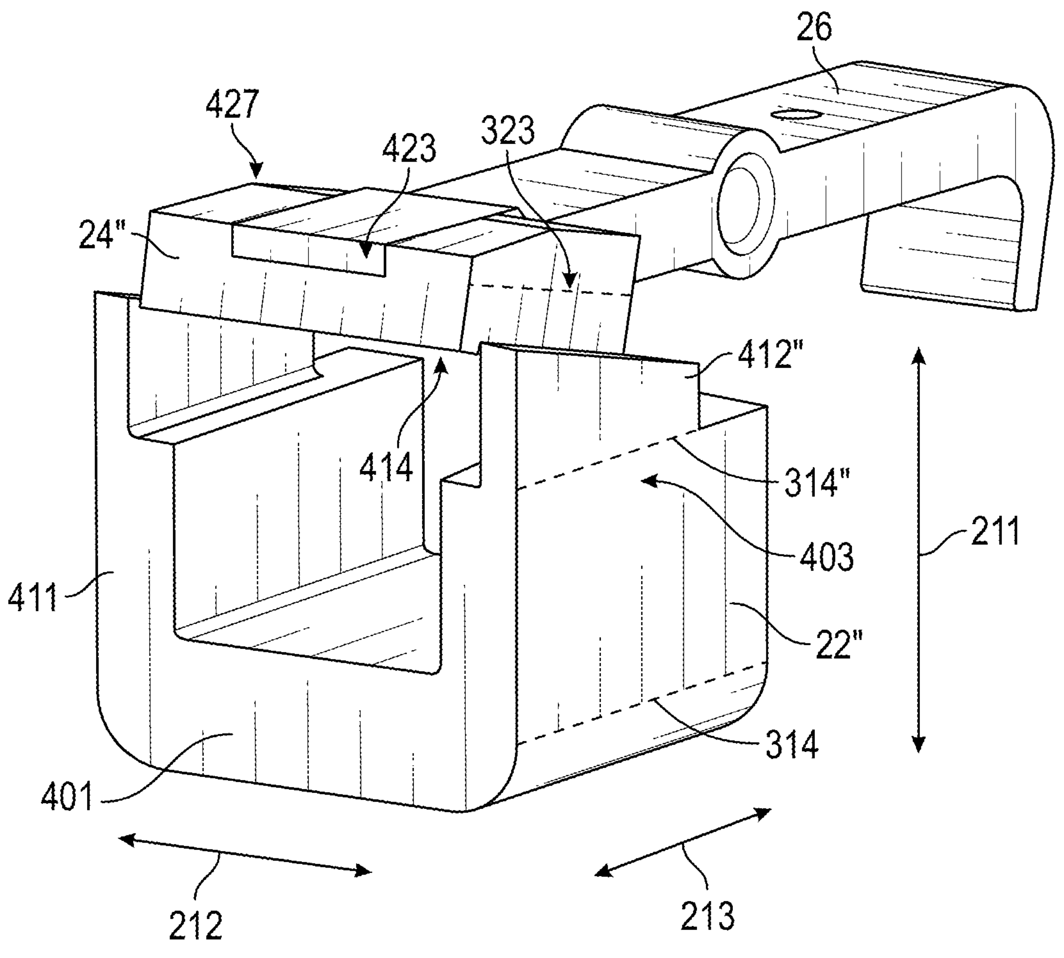
FIG. 7 is a perspective view of the entire trip mechanism shown in FIGS. 3-4 that includes minor variations to the improved U-core and armature plate arrangement shown in FIGS. 6A-6B and a lever arm coupled to the armature plate, in accordance with an example embodiment of the disclosed concept.

The advantageous designs of the disclosed improved U-core 22 and armature plate 24 will now be detailed in conjunction with FIGS. 5A-7, by comparing the disclosed improved U-cores 22', 22" and armature plates 24', 24" shown in FIGS. 6A-7 with a prior art U-core 62 shown in FIGS. 5A-5B. In FIGS. 6A-6B, a U-core 22' and armature plate 24' are shown, and in FIG. 7, a U-core 22" and armature plate 24" are shown. This is done in order to highlight certain minor structural differences between the U-core 22' and armature plate 24' of FIGS. 6A-6B and the U-core 22" and armature plate 24" of FIG. 7. As detailed further later herein in connection with FIGS. 7 and 6A-6B, these minor structural differences between the U-cores 22' and 22" and between the armature plates 24' and 24" enable the U-core 22" to generate comparatively more magnetic force than the U-core 22', although it should be noted that both the U-core 22' and U-core 22" generate significantly more magnetic force than the prior art U-core 62 and thus provide significantly improved performance over the prior art U-core 62 when used in the circuit breaker 1 to open the movable conductor 17. Thus, either U-core 22' or 22" and either armature 24' or 24" can be used in the circuit breaker 1 in accordance with the disclosed concept, such that either U-core 22' or 22" can be referred to generally using the reference number 22 and such that either armature plate 24' or 24" can be referred to generally using the reference number 24 (hence the use of the reference numbers 22 and 24 in FIGS. 3-4).

FIG. 5A shows a prior art U-core 62 and prior art armature plate 64 that is used in at least one known prior art circuit breaker having a similar form factor as the disclosed improved circuit breaker 1. In FIG. 5A, the positioning of the prior art armature plate 64 relative to the prior art U-core 62 is depicted as implemented in the known prior art circuit breaker. The U-core 62 comprises a base 65 and two arms 66 extending from the base 65 such that the two arms 66 are parallel to one another. The base comprises a plate-facing surface 67, and each arm 66 comprises a plate-facing surface 68. The arm's plate-facing surfaces 68 are co-planar with one another and face away from the base 65. In addition, each arm's plate-facing surface 68 is parallel to the base's plate-facing surface 67. For each arm 66, the plate-facing surface 68 is located on an end of the arm 66 disposed opposite the end of the arm 66 that connects to the base 65. In the prior art circuit breaker, the U-core 62 and armature plate 64 are positioned such that the armature plate 64 faces the arm's plate-facing surfaces 68 and the base's plate-facing surface 67, and such that the armature plate 64 is spaced apart from the arm's plate-facing surfaces 68 by a distance 301. When the prior art U-core 62 is magnetized by a fault current, the U-core 62 pulls the armature plate 64 toward the U-core 62 such that the armature plate 64 engages both plate-facing surfaces 68 of the U-core 62.

As previously stated, achieving faster opening of separable contacts in a circuit breaker is a known objective in the relevant technical field. Complementing the objective of faster opening is achieving a wider contact gap, i.e. being able to increase the distance that separates the separable contacts at the conclusion of an opening operation. Plug-on type miniature circuit breakers have a compact form factor with a small footprint, and so there is limited opportunity to increase the contact gap that can be achieved during an opening operation of the separable contacts. In viewing the positioning of the components of the trip mechanisms 10, the operating mechanism 12, and the movable and stationary conductors 16,17 in FIG. 3, it can be seen that achieving a wider contact gap in a circuit breaker having a magnetic trip mechanism of a type similar to the trip mechanisms 10 (i.e. comprising an armature plate coupled to a lever arm and spaced a distance away from a U-core) requires spacing the armature plate and the U-core further away from one another. Referring now to FIG. 5B, in order to achieve a larger contact gap using the prior art U-core 62 and armature plate 64, the prior art U-core 62 and armature plate 64 need to be moved further apart so that they are separated by a distance 303 that is greater than the distance 301. When the distance between the prior art U-core 62 and armature plate 64 is increased from distance 301 to distance 303 though, the pulling force exerted upon the armature plate 64 by the U-core 62 is decreased by an undesirable amount.

Reference is now made to FIGS. 6A and 6B, which show two perspective views of the disclosed improved U-core 22' and armature plate 24', in accordance with an exemplary embodiment of the disclosed concept. It is noted that some reference numbers are only included in FIG. 6A and that some reference numbers are only included in FIG. 6B, for clarity of illustration. The U-core 22' is referred to hereafter primarily using the reference number 22 in order to emphasize that the advantageous features discussed also apply to the U-core 22" shown in FIG. 7. The armature plate 24' is similarly referred to hereafter primarily using the reference number 24 in order to emphasize that the advantageous features discussed also apply to the armature plate 24" shown in FIG. 7. When the minor differences between the U-core 22' and the U-core 22" and between the armature plate 24' and armature plate 24" need to be highlighted, the reference numbers 22', 22", 24', 24" are used instead. The minor structural differences between the U-core 22' and armature plate 24' of FIGS. 6A-6B and the U-core 22" and armature plate 24" of FIG. 7 are discussed later in conjunction with FIG. 7.

The disclosed improved U-core 22 comprises a base 401 and two arms 403 extending from the base 401, with one arm 403 being connected to a first end of the base 401 and the other arm 403 being connected to a second end of the base 401 disposed opposite the first end, such that the base 401 extends between the two arms 403. The dimension in which the arms 403 extend from the base 401 is referred to hereafter as the height dimension 211. The dimension in which the base 401 extends between the arms 403 is referred to hereafter as the width dimension 212, with the width dimension 212 being orthogonal to the height dimension 211. The dimension disposed orthogonally to both the height dimension 211 and the width dimension 212 is referred to hereafter as the depth dimension 213.

Relative to the width dimension 212, each arm 403 comprises two distinct widths, a major with 311 and a minor width 313, with the major width 311 spanning a greater distance in the width dimension 212 than the minor width 313. The portion of each arm 403 that is adjacent to the base 401 has the major width 311, and the portion of each arm 403 disposed opposite the base 401 has the minor width 313. The height of the base 401 relative to the height dimension 211 is equivalent in length to the major width 311, and as such, the reference number 311 can also be used to refer to the height of the base 401 (i.e. the "height 311"). In addition, because the portions of the U-core 22 that are of the major width 311 comprise majority of the U-core 22, the reference number 311 can also be used to refer to the majority thickness of the U-core 22 (i.e. the "majority thickness 311").

For each arm 403, the interfacing of the portion having the major width 311 and the portion having the minor width 313 results in a step 405 being formed in each arm 403. Each step 405 has a depth 314 (which is also the depth 314 of the base 401) and comprises a planar plate-facing surface 407, with the plate-facing surface 407 extending in both the width dimension 212 and the depth dimension 213, and the plate-facing surfaces 407 of the two arms 403 are co-planar in a plane orthogonal to the height dimension 211. The base 401 comprises its own planar plate-facing surface 408, with the plate-facing surface 408 extending in both the width dimension 212 and the depth dimension 213, and it is noted that the arms' plate-facing surfaces 407 are parallel to the base's plate-facing surface 408.

Each arm 403 further comprises a planar slanted surface 409 at the end of each arm 403 disposed opposite the base 401, with said slanted surface 409 extending in both the width dimension 212 and the depth dimension 213 and being non-orthogonal to the height dimension 211. The slanted surfaces 409 of the two arms 403 are co-planar in a plane that is non-orthogonal to the height dimension 211. As such, for each arm 403, the slanted surface 409 and the plate-facing surface 407 are not parallel, and the slanted surface 409 is not parallel to the base's plate-facing surface 408. As a result, each arm 403 has a major height 315 and a minor height 317, with the major height 315 extending a greater distance in the height dimension 211 than the minor height 317 (in FIG. 6A, the major height is the sum of the distance 'x' and the distance 'y').

The portion of each arm 403 extending from the base 401 to the plate-facing surface 407 (corresponding to distance 'y' in FIG. 6A and having the major width 311) can be referred to as the thick portion 411 of the arm 403, and the portion of each arm 403 extending from the plate-facing surface 407 to the slanted surface 409 (having the minor width 313) can be referred to as the thin portion 412 of each arm 403 (i.e. due to the width 311 of the thick portion 411 being greater than the width 313 of the thin portion 412). Each thick portion 411 has a uniform height in the height dimension 211, while each thin portion 412 has a non-uniform height in the height dimension 211, due to the slant of the slanted surface 409 relative to the plate-facing surface 407.

The armature plate 24 has a width 321 relative the width dimension 212 and a depth 323 relative to the depth dimension 213, the depth 323 being orthogonal to the width 321. The U-core 22 is structured such that the distance between the thin portions 412 of the two arms 403 is slightly greater than the armature plate's width 321, and such that the distance between the thick portions 411 of the two arms 403 is less than the armature plate's width 321. As such, the U-core 22 is structured to receive the armature plate 24 between the thin portions 412 of the arms 403, but is structured not to receive the armature plate 24 between the thick portions 411 of the arms 403.

The trip mechanism 10 is structured such that, when the trip mechanism 10 is installed in the circuit breaker 1 and in the unactuated state (i.e. such that the U-core 22 is not sufficiently energized to exert a pull force on the armature plate 24), the armature plate 24 is spaced apart from the U-core's steps 405, with the armature plate's width 321 being disposed between the thin portions 412 of the U-core's arms 403 relative to the width dimension 212. In the unactuated state, the armature plate 24 can either be disposed such that its core-facing surface 414 is positioned above the U-core's slanted surfaces 409 (i.e. as shown in FIGS. 6A-6B, "above" being relative to the view shown in FIGS. 6A-6B), or such that the armature plate 24 is disposed at least partially between the U-core's arms 403 and steps 405 (relative to the height dimension 211). In either case, the trip mechanism 10 is structured to be installed so that the armature plate's core-facing surface 414 is parallel to or co-planar with the slanted surfaces 409 of the arms 403 when the U-core 22 is unenergized, in order to maximize the magnetic field lines generated when the U-core 22 gets energized during a fault condition. When the U-core 22 is energized during a fault condition, the magnetic field of the U-core 22 pulls the armature plate 24 toward the U-core's steps 405 such that movement of the armature plate 24 is stopped once the armature plate's core-facing surface 414 engages the plate-facing surfaces 407 of the steps 405.

Reference is now made to FIG. 7 in conjunction with FIGS. 6A and 6B to discuss the minor structural differences between the U-core 22' and armature plate 24' (FIGS. 6A-6B) and the U-core 22" and armature plate 24" (FIG. 7). The U-core 22" (FIG. 7) has all of the same features as the U-core 22' (FIGS. 6A-6B), except with respect to the depths of the thin portions of the arms. Specifically, for the U-core 22' (FIGS. 6A-6B), the thin portion 412 of each arm 403 has the same depth 314 as the thick portion 411 and the base 401. Meanwhile, for the U-core 22" (FIG. 7), the base 401 and thick portion 411 of each arm 403 have the depth 314, but the thin portion 412" has a shorter depth 314" that does not span as far a distance as depth 314, relative to the depth dimension 213.

Still referring to FIG. 7 in conjunction with FIGS. 6A and 6B, the armature plates 24' and 24" differ from one another in the features of each that enable them to be coupled to the lever arm 26. Specifically, the armature plate 24' (FIGS. 6A-6B) is of a uniform thickness and is formed with apertures 421 structured to receive fasteners that can couple the lever arm 26 to the armature plate 24'. Meanwhile, the armature plate 24" (FIG. 7A) is formed with a depression 423 structured to receive and be coupled to one end of the lever 26, such that the armature plate 24" is less thick where the depression 423 is formed. In addition, while both armature plates 24', 24" have a planar core-facing surface 414 structured to face toward the U-core 22, the armature plate 24' (FIGS. 6A-6B) has a second surface 426 disposed opposite the core-facing surface 414 that is also planar and parallel to the core-facing surface 414 such that the armature plate 24' is of a uniform thickness, while the armature plate 24" instead has a second side 427 disposed opposite the core-facing surface 414 that comprises more than one plane and is thus not of a uniform thickness. The depression 423 and second side 427 are features that make it easier to couple the lever 26 to the armature plate 24" during the manufacturing process. In both U-core embodiments 22', 22" and both armature plate embodiments 24', 24", the depth 314, 314" of the U-core arms' thin portions 412, 412" is at least as deep as the depth 323 of the armature plate 24.

As previously stated, the minor structural differences of the U-core 22" (FIG. 7) relative to the U-core 22' (FIGS. 6A-6B) enable the U-core 22" to generate comparatively more magnetic force than the U-core 22'. However, it should be noted that both the U-core 22' and the U-core 22" generate significantly more force than the prior art U-core 62 and that the difference between the forces generated by U-core 22' and the U-core 22" is minor in comparison. For the purpose of the magnetic force exerted by the U-core 22' or 22" on the armature plate 24' or 24" when fault current is present in the load conductor 8, the depth 314, 314" of each arm's thin portion 412, 412" being at least as deep as the depth 323 of armature plate 24 is the most significant factor, not the depth 314, 314" of each arm's thin portion 412, 412" compared to its thick portion 411. Because the depth 314, 314" of both U-core embodiments 22', 22" is at least as deep as the depth 323 of the armature plate, both U-cores 22', 22" and armature plates 24', 24" are able to open the movable conductor 17 to the desired contact gap within the desired timeframe. In addition, regarding the armature plates 24' and 24", the difference between the second surface 426 of the armature plate 24' and the second side 427 of the armature plate 24" is not as significant a factor in the performance of either armature plate 24', 24" as the size of the core-facing surface 25 of each armature plate 24', 24" is. That is, the most significant factor in each armature plate 24', 24" providing improved performance over the prior art armature plate 64 is that the surface area of the core-facing surface 414 of each armature plate 24', 24" is similar in size to the area that spans the gap between the thin portions 412, 412" of the two arms 403, 403" of the corresponding U-core 22', 22" in both the width and depth dimensions 212 and 213.

Compared to the prior art U-core 62 and armature plate 64, the disclosed improved U-core 22 and armature plate 24 significantly reduce the reluctance of the magnetic field path generated when fault level current is present in the associated load conductor 8. The reduced reluctance relative to the prior art U-core 62 and armature plate 64 is achieved both through increasing the surface areas of the improved U-core 22 and armature plate 24 whose magnetic fields interact, and by reducing the air gap between the aggregate surface areas of the improved U-core 22 and armature plate 24 whose magnetic fields interact. One manner in which surface area is increased in the disclosed improved U-core 22 and armature plate 24 is that the majority thickness 311 of the improved U-core 22 is thicker than the corresponding thickness of the prior art U-core 62. The increased thickness 311 of the improved U-core 22 enables the overall structure of the U-core 22 to be less wide than the prior art U-core 62 relative to the width dimension 212 without compromising the objective of reducing magnetic reluctance, and the reduced width of the U-core 22 results in the circuit breaker 1 incorporating the improved trip mechanism 10 having a footprint that is approximately 15% less than that of the prior art circuit breaker that uses the prior art U-core 62 and armature plate 64.

In addition, structuring the improved U-core 22 to have the steps 405 and to receive the armature plate 24 between the arms' thin portions 412 when the U-core 22 is energized, rather than preventing the armature plate 64 from being received within the U-core 62 between the arms 66, significantly reduces the air gap between the aggregated surfaces of the U-core 22 and the core-facing surface 414 of the armature plate 24, relative to the prior art U-core 62 and armature plate 64. Furthermore, structuring the U-core's slanted surfaces 409 as slanted rather than parallel to the base's plate-facing surface 408, and structuring the armature plate 24 to have the core-facing surface 414 be disposed parallel to or co-planar with the U-core's slanted surfaces 409 in the unactuated state, results in a greater surface area of the U-core 22 and of the armature plate 24 interacting and thus a greater number of magnetic flux lines traveling from the U-core 22 to the armature 24.

Figure 8:
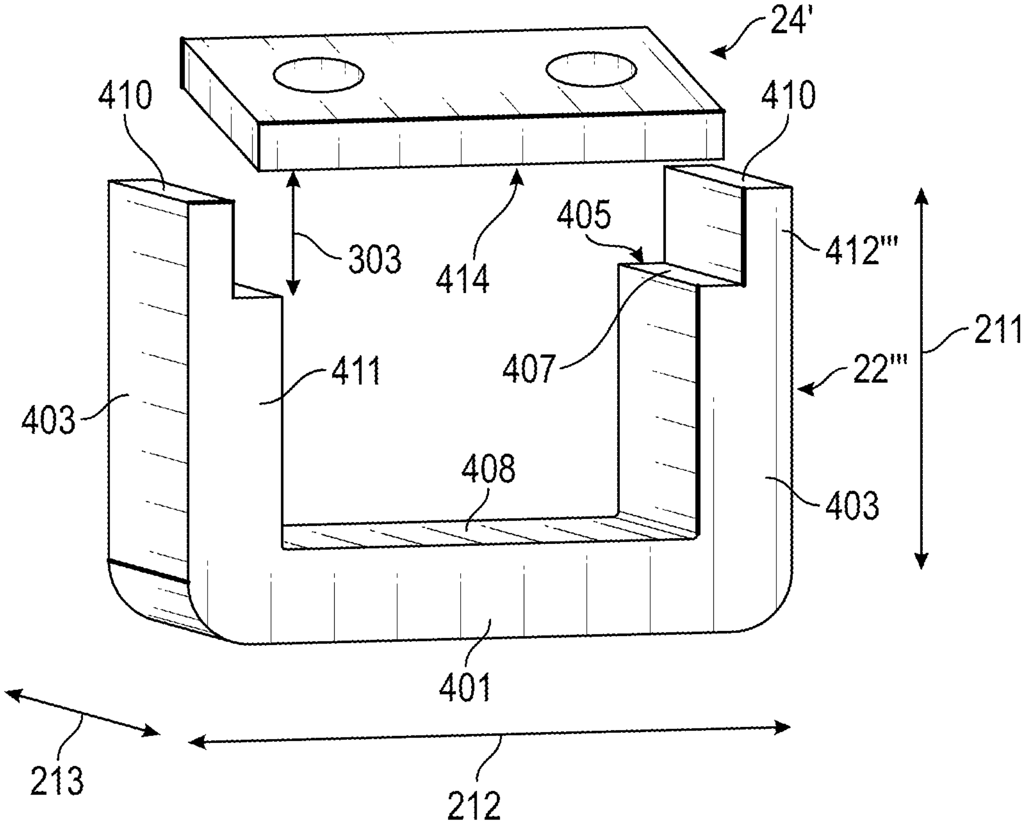
FIG. 8 is a perspective view of another embodiment of the improved U-core and armature plate arrangement that can be used in the circuit breaker shown in FIGS. 2-4, in accordance with another example embodiment of the disclosed concept.

Reference is now made to FIG. 8, which is a perspective view of another embodiment 22" of the disclosed improved U-core 22, which can be used in conjunction with the armature plate 24' (or the armature plate 24"), in accordance with another exemplary embodiment of the disclosed concept. The U-core 22'" of FIG. 8 has all of the same features and dimensions as the U-core 22' shown in FIGS. 6A-6B, except that the thin portions 412'" of the U-core 22' comprise flat plate-facing surfaces 410 instead of the slanted surfaces 409 that the U-core 22' comprises, and the height of the arms 403 of the U-core 22'" relative to the height dimension 211 is less than the minor height 317 of the arms 403 of the U-cores 22' and 22". In contrast with the slanted surfaces 409 of the U-cores 22' and 22", the plate-facing surfaces 410 of the U-core 22'" are parallel to the arms' plate-facing surfaces 407 and to the base's plate-facing surface 408. While the slanted surfaces 409 enable the U-cores 22' and 22" to generate a stronger magnetic pull on the corresponding armature plates 24 than the U-core 22" can generate with its flat plate-facing surfaces 410, the U-core 22'" still exerts a significantly stronger magnetic force on the armature plate 24' than the prior art U-core 62 exerts on the prior art armature plate 64, due to the U-core 22'" including the steps 405 and thus being structured to receive the armature plate 24' between its arms' thin portions 412'" when the U-core 22'" is energized. Thus, the U-core 22' and armature plate 24' can also be used in the trip mechanisms 10 of the circuit breaker 1 to provide improved performance over the prior art U-core 62 and armature plate 64 with respect to both opening time and contact gap.

The performance of the prior art U-core 62 and armature plate 64 and the performance of the embodiments of the disclosed improved U-core 22 and armature plate 24 have been compared based on the maximum distance traveled by the respective armature plates during a trip operation being the distance 303 numbered in FIGS. 5B, 6A, and 8. For the prior art U-core 62 and armature plate 64, the armature plate 64 was positioned so that, when the U-core 62 was not energized, the shortest distance between the armature plate 64 and the plate-facing surfaces 68 of the U-core 22 was the distance 303 (FIG. 5B). For the disclosed improved U-core 22 and armature plate 24, the armature plate 24 was positioned so that, when the U-core 22 was unenergized, the shortest distance between the armature plate 24 and the plate-facing surfaces 407 of the U-core 22 was the distance 303 (FIGS. 6A, 8).

For a fault current of 2000 A, the prior art U-core 62 generated about 1.16 Newtons (N) of pulling force. Incremental changes were made to the prior art U-core 62 before arriving at the embodiments of the disclosed improved U-core 22. First, only the thickness of the U-core 62 was increased, so that the U-core had the same general shape as the U-core 62 but with the maximum thickness possible (i.e. corresponding to the majority thickness 311 shown in FIG. 6A) needed to maintain the air gap between the U-core and the armature plate that would achieve the desired contact gap between the separable contacts 6,7 during an opening operation. The U-core 62 thus modified to have the thickness 311 was able to generate about 2.2 N of pulling force. Next, the U-core 62 modified to have thickness 311 was further modified to have steps formed in its arms, corresponding to the steps 405 (FIG. 6A). The further modified U-core having thickness 311 and the steps 405, i.e. the U-core 22''' shown in FIG. 8, was able to generate about 3.5 N of pulling force. The final modification made to the U-core 22 was to form the arm surfaces disposed opposite the base as slanted surfaces, i.e. as the slanted surfaces 409 (FIG. 6A). The U-core 22 having the majority thickness 311, the steps 405, and the slanted surfaces 409, i.e. the U-cores 22' and 22" shown in FIGS. 6A-7, generated about 8.7 N of pulling force.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A trip mechanism for use with a circuit breaker, the circuit breaker including a movable conductor and an operating mechanism structured to actuate the movable conductor, the movable conductor being structured to be actuated between a closed state and an open state relative to a stationary conductor in order to respectively close and open an electrical connection between a line conductor and a load conductor, wherein the operating mechanism is configured to actuate the movable conductor to its open state when the operating mechanism is disengaged from the trip mechanism, the trip mechanism comprising:

a magnetizable U-core structured to be coupled to the load conductor and to be energized by current through the load conductor, the U-core being a U-shaped core;

an armature structured to be actuated by the U-core; and a lever arm coupled at one end to the armature, wherein the lever arm is structured to maintain engagement with the operating mechanism when current through the load conductor is within a current rating of the circuit breaker, wherein the U-core comprises a base and two arms extending from the base, the base extending between the two arms in a width dimension and the two arms extending from the base in a height dimension orthogonal to the width dimension, wherein each arm of the U-core comprises a thick portion having a major width and a thin portion having a minor width, the major width spanning a greater distance in the width dimension than the minor width, the thick portion extending from the base to the thin portion, the thin portion extending from the thick portion away from the base, wherein, for each arm of the U-core, a step is formed at an interface of the thick portion and the thin portion, wherein the U-core is structured such that, when current through the load conductor is within the current rating of the circuit breaker, the armature remains spaced apart from the steps of the U-core and positioned between the thin portions of the U-core relative to the width dimension, wherein the U-core is structured to be energized to pull the armature between the thin portions of the U-core toward the steps of the U-core when current flowing through the circuit breaker reaches a fault level threshold, such that the lever arm gets rotated to an actuated position, and wherein the lever arm is configured to disengage from the operating mechanism when the lever arm gets rotated to the actuated position.

2. The trip mechanism of claim 1, wherein, for each arm of the U-core, the thin portion has a planar slanted surface at an end of the arm disposed opposite the base, with said slanted surface being non-orthogonal to the height dimension.

3. The trip mechanism of claim 2, wherein the trip mechanism is configured to be installed in the circuit breaker such that a planar core-facing surface of the armature is parallel to or co-planar with the slanted surfaces of the U-core when the U-core is not energized.

4. The trip mechanism of claim 1, wherein each thin portion of the U-core comprises a depth relative to a depth dimension, the depth dimension being orthogonal to both the height dimension and the width dimension, wherein the armature plate comprises a depth relative to a depth dimension, and wherein the depth of each thin portion of the U-core is equal to or greater than the depth of the armature plate.

5. The trip mechanism of claim 1, wherein a height of the base relative to the height dimension is equal to the distance spanned by the major width.

6. The trip mechanism of claim 1, wherein the thick portions of the U-core are structured such that, when the armature is pulled between the thin portions toward the steps of the U-core, the steps obstruct the armature from moving further toward the base once the steps engage the armature.

7. A circuit breaker, the circuit breaker comprising:

a plurality of pole assemblies, each pole assembly comprising:

a line conductor and load conductor structured to provide an electrical connection between a corresponding load and a power source;

a stationary conductor;

a movable conductor, the movable conductor being structured to be actuated between a closed state and an open state relative to the stationary conductor in order to respectively close and open the electrical connection between the line conductor and the load conductor; and a trip mechanism structured to be actuated when current through the load conductor exceeds a predetermined threshold, the trip mechanism comprising:

a magnetizable U-core coupled to the load conductor, the U-core being a U-shaped core;

an armature structured to be actuated by the U-core; and a lever arm coupled at one end to the armature; and an operating mechanism, the operating mechanism being aligned with exactly one of the pole assemblies and being operably coupled to the movable conductor of every pole assembly;

wherein, with respect to the one pole assembly with which the operating mechanism is aligned, the lever arm of the one pole assembly is positioned to engage the operating mechanism when current through all of the pole assemblies is within the current rating of the circuit breaker;

wherein each trip mechanism is operably coupled to every other trip mechanism in the circuit breaker, wherein, for each trip mechanism:

the U-core comprises a base and two arms extending from the base, the base extending between the two arms in a width dimension and the two arms extending from the base in a height dimension orthogonal to the width dimension, each arm of the U-core comprises a thick portion having a major width and a thin portion having a minor width, the major width spanning a greater distance in the width dimension than the minor width, the thick portion extending from the base to the thin portion, the thin portion extending from the thick portion away from the base, for each arm of the U-core, a step is formed at an interface of the thick portion and the thin portion, the trip mechanism is structured such that, when current through all pole assemblies is within the current rating of the circuit breaker, the armature is spaced apart from the steps of the U-core and positioned between the thin portions of the U-core relative to the width dimension, and the trip mechanism is structured such that, when current through the corresponding pole assembly reaches a fault level threshold, the U-core gets energized and pulls the armature between the thin portions of the U-core toward the steps of the U-core, such that the lever arm of the corresponding pole assembly and the lever arm of every other pole assembly gets rotated to an actuated position, wherein, with respect to the one pole assembly with which the operating mechanism is aligned, the lever arm of the one pole assembly is configured to disengage from the operating mechanism when the lever arm of the one pole assembly gets rotated to the actuated position, and wherein the operating mechanism is configured to actuate all of the movable conductors to their open state when the operating mechanism is disengaged from the lever arm of the one pole assembly.

8. The circuit breaker of claim 7, wherein, for each U-core, the thin portion of each arm has a planar slanted surface at an end of the arm disposed opposite the base, with said slanted surface being non-orthogonal to the height dimension.

9. The circuit breaker of claim 8, wherein, for each trip mechanism, the trip mechanism is structured such that a planar core-facing surface of the armature is parallel to or co-planar with the slanted surfaces of the U-core when the U-core is not energized.

10. The circuit breaker of claim 7, wherein, for each trip mechanism:

each thin portion of the U-core comprises a depth relative to a depth dimension, the depth dimension being orthogonal to both the height dimension and the width dimension, the armature plate comprises a depth relative to a depth dimension, and the depth of each thin portion of the U-core is equal to or greater than the depth of the armature plate.

11. The circuit breaker of claim 7, wherein, for each U-core, a height of the base of the U-core relative to the height dimension is equal to the distance spanned by the major width of the U-core.

12. The circuit breaker of claim 7, wherein, for each U-core, the thick portions of the U-core are structured such that, when the armature is pulled between the thin portions toward the steps of the U-core, the steps obstruct the armature from moving further toward the base once the steps engage the armature.

* * * * *